(12) United States Patent
Herzog et al.

(10) Patent No.: US 8,912,267 B2
(45) Date of Patent: Dec. 16, 2014

(54) PROCESS FOR PRODUCING POLYMER-FUNCTIONALIZED FILLER PARTICLES

(71) Applicant: Continental Reifen Deutschland GmbH, Hannover (DE)

(72) Inventors: Katharina Herzog, Harsum (DE); Phillip Vana, Bad Gandersheim (DE); Lena Mueller, Lauenhagen (DE); Bjoern Springer, Hanau (DE); Carla Recker, Hannover (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 13/902,275

(22) Filed: May 24, 2013

(65) Prior Publication Data

US 2013/0261272 A1 Oct. 3, 2013

Related U.S. Application Data

(63) Continuation of application No. PCT/EP2011/070538, filed on Nov. 21, 2011.

(30) Foreign Application Priority Data

Nov. 24, 2010 (DE) .......................... 10 2010 060 780

(51) Int. Cl.
| | | |
|---|---|---|
| *C08K 3/34* | (2006.01) | |
| *C08F 4/00* | (2006.01) | |
| *C08F 236/06* | (2006.01) | |
| *B60C 1/00* | (2006.01) | |
| *C08K 3/36* | (2006.01) | |
| *C08K 9/06* | (2006.01) | |
| *C09C 1/30* | (2006.01) | |
| *C09C 1/56* | (2006.01) | |
| *C09C 3/10* | (2006.01) | |

(52) U.S. Cl.
CPC ............. *C08F 236/06* (2013.01); *B60C 1/0016* (2013.01); *C08K 3/36* (2013.01); *C08K 9/06* (2013.01); *C09C 1/3072* (2013.01); *C09C 1/56* (2013.01); *C09C 3/10* (2013.01)
USPC .......................................... 524/493; 526/194

(58) Field of Classification Search
USPC ....................................................... 524/493
See application file for complete search history.

(56) References Cited

U.S. PATENT DOCUMENTS

| 6,998,452 | B1* | 2/2006 | Parker ........................... 526/194 |
| 2010/0087603 | A1* | 4/2010 | Brittain et al. ................ 525/342 |
| 2010/0222504 | A1 | 9/2010 | Minge et al. |
| 2010/0261808 | A1* | 10/2010 | Schadler et al. .............. 523/205 |

FOREIGN PATENT DOCUMENTS

EP    0 272 127 A2    6/1988

OTHER PUBLICATIONS

Rotzoll et al., J. Polymer Science, Part A, vol. 46, 7656-7666, 2008.*
Yang et al., Polymer, vol. 48, 3444-3451, 2007.*
International Search Report dated Jul. 20, 2012 of international application PCT/EP2011/070538 on which this application is based.

* cited by examiner

*Primary Examiner* — Hui Chin
(74) *Attorney, Agent, or Firm* — Walter Ottesen P.A.

(57) ABSTRACT

A process for producing polymer-functionalized filler particles and polymer-functionalized filler particles obtained by this process. The polymer-functionalized filler particles are used as additives for rubber mixtures. The polymers for functionalizing the filler particles are obtained in-situ starting from filler particles having a surface-bound RAFT agent. The binding of silyl-bearing RAFT agents and of Diels-Alder RAFT agents occurs via the R-group and the subsequent RAFT polymerization proceeds via a reactive site of the RAFT agent.

9 Claims, 9 Drawing Sheets

PROCESS FOR PRODUCING POLYMER-FUNCTIONALIZED FILLER PARTICLES

CROSS REFERENCE TO RELATED APPLICATIONS

This application is a continuation application of international patent application PCT/EP2011/070538, filed Nov. 21, 2011, designating the United States and claiming priority from German application 10 2010 060 780.0, filed Nov. 24, 2010, and the entire content of both applications is incorporated herein by reference.

FIELD OF THE INVENTION

The invention relates to a process for producing polymer-functionalized filler particles, to the polymer-functionalized filler particles obtained by the process and to their use in rubber mixtures.

BACKGROUND OF THE INVENTION

The physical properties of organic-inorganic hybrid materials depend appreciably on the strength but also the structure and properties of the interface between the components present therein. Coupling reagents are usually used to amplify the interaction between the polymeric phase and the filler phase. They are frequently functionalized alkyl-, alkoxy- or halosilanes capable of establishing a covalent bond to the filler surface in the course of vulcanization and/or curing of the polymeric system. This conventional process has the disadvantage that often merely a low coupling density is achieved. It also offers only limited scope, if any, for controlled manipulation of the interphase between the polymeric matrix and the filler surface.

Reversible addition fragmentation chain transfer (RAFT) is a promising method of conducting free-radical polymerizations in a controlled manner. The choice and chemical construction of so-called RAFT agents, which contain an R-group and a Z-group, can be varied to control the structural binding of the polymer to the surface. The functional sites of the RAFT agent typically remain directly on the surface during the polymerization (Z-group approach, see FIG. 1 and FIG. 2). The so-called R-groups consequently remain on the polymer and can lead to specific functionalization, albeit structurally limited by the use of the RAFT agent. Specifically, FIG. 2 depicts an immobilized RAFT agent provided on the surface of a filler 100. RAFT polymerization reaction 200 results in the surface modification of the filler with surface-bound polymer 210. The separation and recovery of the RAFT agent in step 220 results in a polymer of well-defined architecture 230 and the immobilized raft agent on the surface of filler 100.

Binding to the filler surface typically proceeds via coupleable silyl substituents, often referred to as Z-group (such as $-Si(OAlk)_3$, $-SiAlk(OAlk)_2$ or $-SiAlk_2(OAlk)$ for example), on the particular RAFT agents. Preparing these silane-substituted RAFT agents and the possibility of crosslinking the individual silane groups of silane-terminated polymer chains is described in United States patent application publication 2010/0222504. However, a person skilled in the art already knew of the preparation of silane-substituted RAFT agents, for example from D. H. Nguyen, P. Vana, *Polymers for Advances Technologies*, 2006, 17, 625 or from L. Barner, T. P. Davis, M. H. Stenzel, C. Barner-Kowollik, *Macromol. Rapid Commun.*, 2007, 28, 539.

Similarly, the attachment of RAFT agents via the coupleable silyl group is described in various publications, for example in C. H. Liu, C. Y. Pan, *Polymer*, 2007, 48, 3679 or Y. L. Zhao, S. Perrier, *Macromolecules*, 2006, 39, 8603. Conventional processes comprise the endowment of polymers with end groups that are reactive toward the filler surface and thus enable covalent or other bonding to the filler surface in the course of the mixing or vulcanizing operation. U.S. Pat. No. 6,998,452, for example, discloses a RAFT agent having a Z-group endowed with a coupleable silyl substituent. The Z-group is the functionality which stabilizes the free-radical intermediate following addition of a polymer chain. This method of polymerization is referred to as the "grafting to" approach. Disadvantages here are the low grafting densities and a certain degree of instability, since the thiocarbonylthio group of the control agent is involved in the bonding to the filler. Moreover, localizing the graft group on the filler surface means that further modification of the second, free end of the polymer is no longer possible. What is more, steric hindrances between the propagating chains and the surface-attached chains become increasingly influential in this approach, since the reactive chains first have to diffuse through the surficially bound layer of polymer in order that they may react with the functional RAFT group.

The possibility of RAFT polymerizing particles of carbon black is already known from Q. Yang, L. Wang, W. D. Xiang, J. F. Zhou, Q. H. Tan, *Polymer* 2007, 48, 3444. However, these authors use a different mechanism of attaching, for which the carbon black needs to be profoundly surface-modified, which is costly and inconvenient in that multiple steps are needed and only minor quantities can be prepared.

SUMMARY OF THE INVENTION

The problem addressed by the present disclosure is therefore that of providing a process for producing polymer-functionalized filler particles and polymer-functionalized filler particles obtained by this process so as to obtain advantages, especially with regard to
   higher grafting density;
   improved chemical stability;
   subsequent modifiability; and,
   specific control being exertable on the interface between the solid phase and the polymeric matrix;
and to thereby be able to prevent the above-mentioned disadvantages. Mixing the polymer-functionalized filler particles of the present disclosure into a rubber mixture shall, after crosslinking, bring about a discernible improvement in filler-polymer interaction and hence distinctly optimized properties on the part of the mixture.

This problem is solved by a process for producing polymer-functionalized filler particles and by polymer-functionalized filler particles obtained by the process, wherein the process is characterized by the following steps at least:
   binding a control agent for a controlled free-radical polymerization of monomers on a surface of a filler particle; the control agent containing an R-group; the R-group containing an R1-group selected from the group consisting of a coupleable silyl group and a Diels-Alder-reactive functionality; the control agent further containing a reactive site for the addition of monomers; wherein the R1-group of the control agent becomes bound to the surface of the filler particle; and,
   then performing the controlled free-radical polymerization of the monomers via the reactive site of the control agent bound to the filler particle.

The binding of silyl-bearing RAFT agents and of Diels-Alder RAFT agents therefore occurs in the above process via the R-group, specifically from the R1-group contained in the R-group, and the subsequent RAFT polymerization thus proceeds from the solid surface of the filler material. The term "RAFT agent" is herein used interchangeably with the term "control agent for controlled free-radical polymerization."

BRIEF DESCRIPTION OF THE DRAWINGS

The invention will now be described with reference to the drawings wherein.

DETAILED DESCRIPTION OF THE BEST AND VARIOUS EMBODIMENTS

The coupleable silyl group R1 is preferably —Si(OAlk)$_3$, —SiAlk(OAlk)$_2$ or —SiAlk$_2$(OAlk) where Alk is a divalent hydrocarbon having 1 to 18 carbon atoms.

Figure 1:
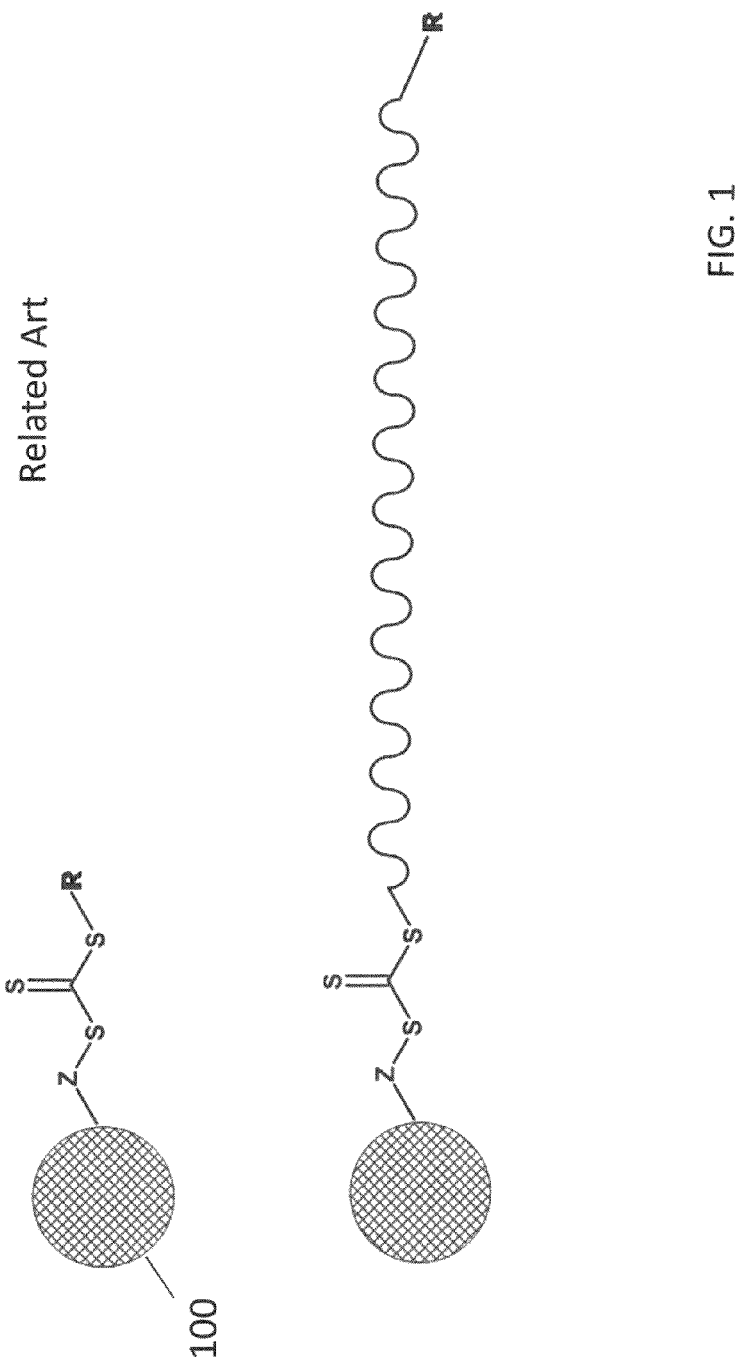
FIG. 1 shows the Z-group approach for preparing modified filler particles 100, exemplified with a trithiocarbonate control agent.
Figure 2:
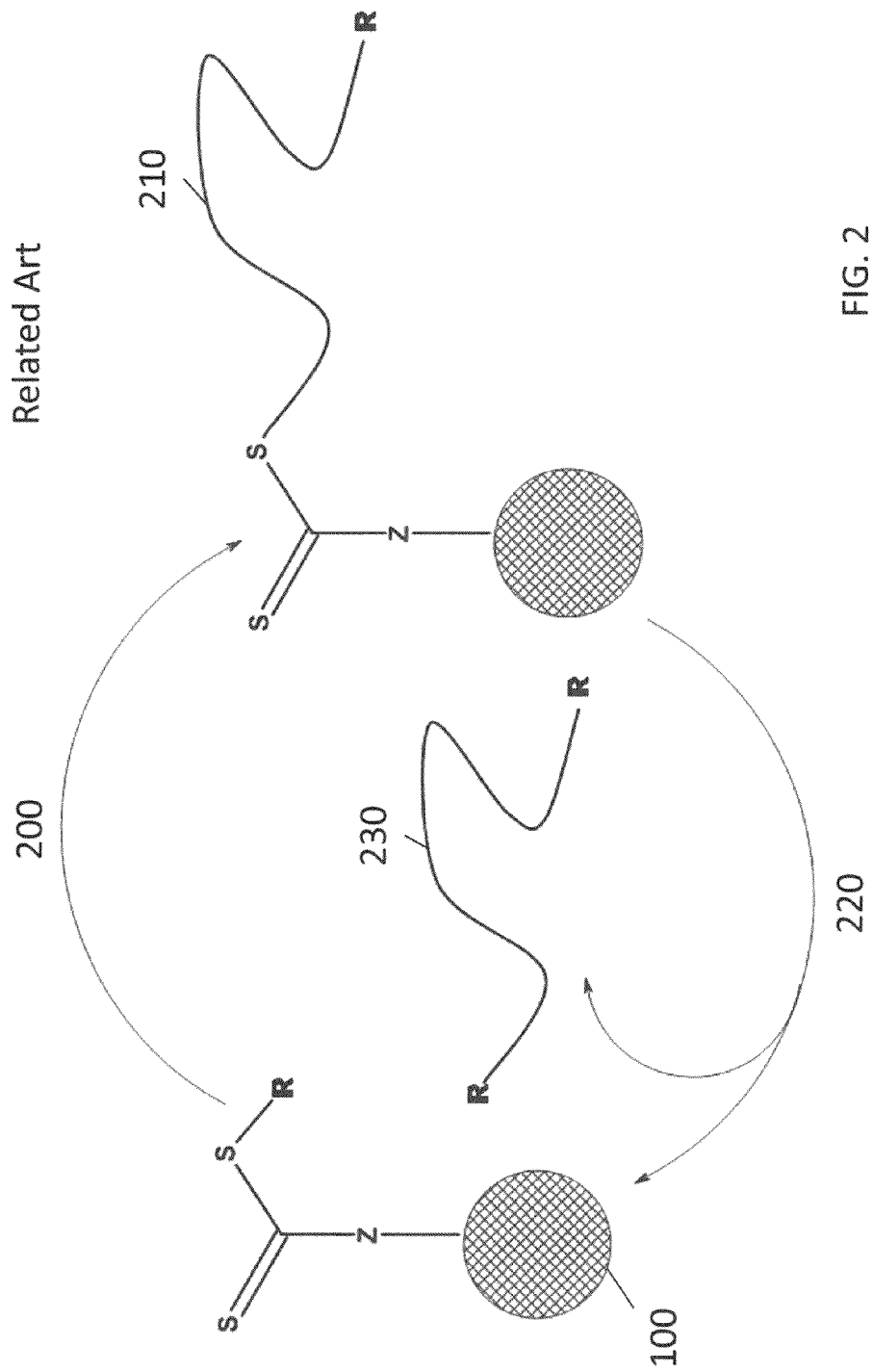
FIG. 2 shows a RAFT polymerization for preparing a polymer 230 of well-defined architecture.
Figure 3:
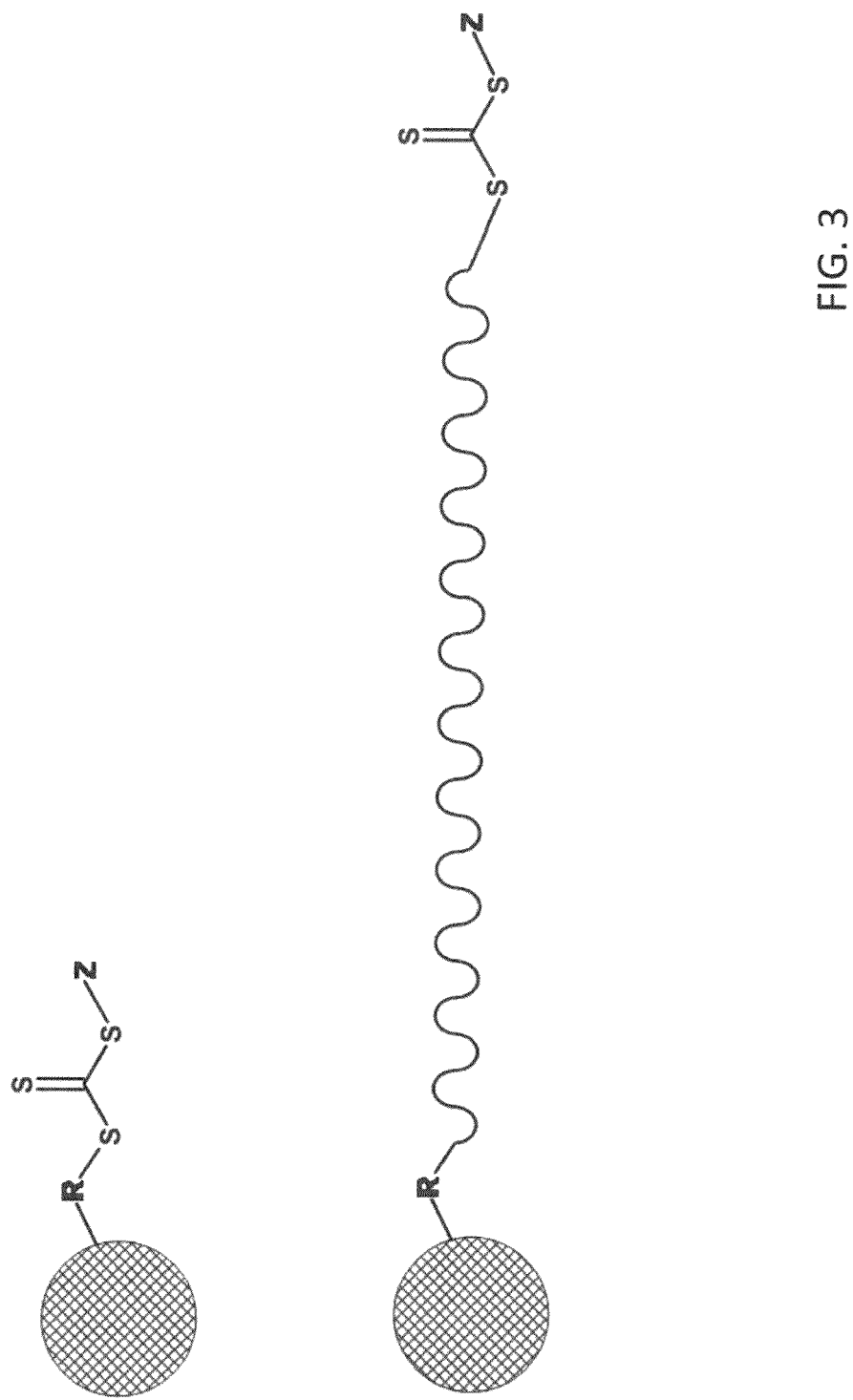
FIG. 3 shows the R-group approach for preparing modified filler particles exemplified with a trithiocarbonate control agent.

Surprisingly, establishing the R1-group, i.e., the coupleable silyl group or the Diels-Alder group on the leaving-capable R-group of the RAFT agent (R-group approach, see FIG. 3) is found to have the following advantages:

The reactive site for the addition of propagating free macroradicals moves away from the surface in the course of the polymerization. This, in contrast to the attachment via the Z-group, implicates reduced steric hindrance between propagating chains and surface-attached chains and hence a higher degree of occupancy. This is important for difficult-to-control monomers such as 1,3-dienes in particular.

After the controlled free-radical polymerization has ended, the functional group of the RAFT agent is at the free end of the chain, the end which is not attached to the filler surface. This opens avenues for the subsequent modification of the functionalized filler.

The fact that, in contradistinction to the Z-group approach, attachment to the polymer is not via the RAFT group also implicates enhanced stability on the part of the end product.

Attachment of the RAFT agent to the filler surface, more particularly to the silica surface, is quantitative and can thus be controlled via the weights used of the materials. Modified/functionalized filler particles having a very wide range of loading densities are accordingly obtainable with the recited advantages.

The filler is preferably silica or carbon black, although other polar or apolar fillers of the type used in the rubber industry can also be used.

Any RAFT agent known to a person skilled in the art can be used. RAFT agents from the group of dithioesters, dithiobenzoates, such as cumyl dithiobenzoates (CDBs), trithiocarbonates, dithiocarbamates, such as 1 phenylethyl 9H-carbazole-9-dithiocarbamate (FCC), and xanthates (also called xanthogenates) will be found to be advantageous in particular.

Figure 4:
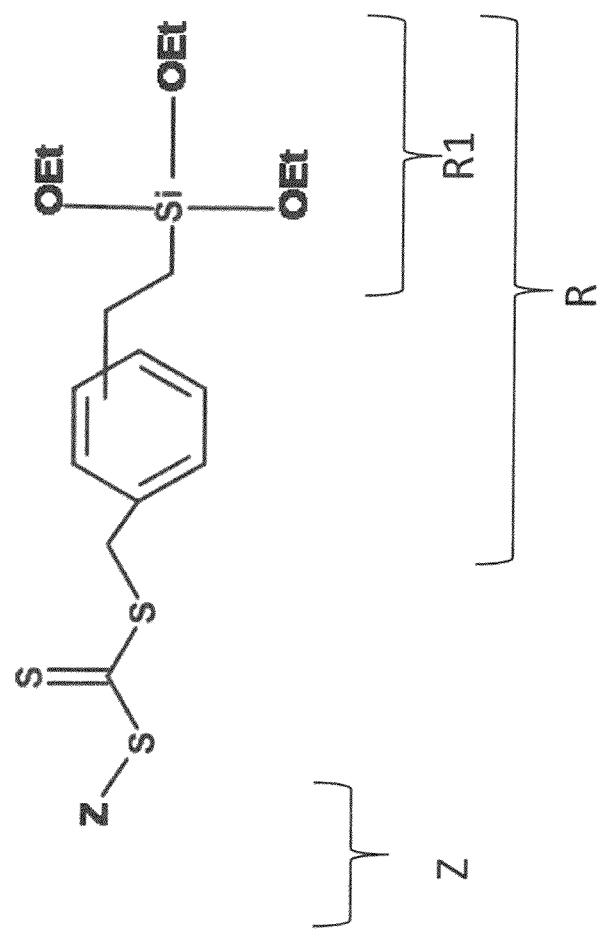
FIG. 4 shows an example of a trithiocarbonate control agent that can be used for the R-group approach. The R-group contains an R1-group for surface attachment. Z is 1-n-hexyl, for example.

Particularly preferred RAFT agents are those of the class of trithiocarbonates (=salts of trithiocarbonic acid) because they are easy to synthesize and even with destruction of the RAFT group a thiol is left behind as functional group (see also FIG. 4). Of these, propyl phenylmethyl trithiocarbonate (PPT) and propyl(trimethoxysilane)ethylphenylmethyl trithiocarbonate (PPTS) and 1,6-hexyldi((trimethoxysilane)ethylphenyl-methyl)trithiocarbonate (HDPS) and bis(1-phenylethyl)trithiocarbonate (BPETC) must be mentioned in particular.

The preparation of individual preferred RAFT agents will now be described:

Preparation of propyl(trimethoxysilane)ethyl-phenylmethyl trithiocarbonate (PPTS) as RAFT Agent for RAFT Polymerization on Silica Surfaces A typical reaction comprises the dropwise addition of propanethiol (6.85 g, 0.09 mol) to an ice-cooled solution of methanol (30 ml) and a 25% solution of sodium methoxide (19.65 g, 0.09 mol) in methanol. The reaction solution is stirred at room temperature for two hours. This is followed by the dropwise addition of carbon disulfide (6.85 g, 0.09 mol) and subsequent stirring of the reaction solution at room temperature for four hours. This is followed by the addition of chloromethylphenyltrimethoxysilane (25.00 g, 0.09 mol) and stirring of the reaction solution at room temperature for 12 hours. Then, the solvent is removed in vacuo and the remainder is taken up in chloroform (60 ml). The organic phase is washed with water (30 ml) and subsequently dried over magnesium sulfate. The solvent is removed in a high vacuum to obtain the desired product as a yellowish oil (26.32 g) in a yield of 75%.

Preparation of 1,6-hexyldi((trimethoxysilane)ethyl-phenylmethyl)trithiocarbonate (HDPS) as RAFT Agent for RAFT Polymerization on Silica Surfaces The synthetic procedure is similar to the reaction protocol for propyl(trimethoxysilane)ethylphenylmethyl trithiocarbonate (PPTS) except that 1,6-hexanedithiol (6.83 g, 0.046 mol) is used in place of propanethiol.

Unbound RAFT agents may additionally be added for enhanced control of the RAFT polymerization on silica surfaces.

Preparation of bis(1-phenylethyl)trithiocarbonate (BPETC)

A mixture of carbon disulfide (1.90 g, 0.025 mol) and cesium carbonate (8.14 g, 0.025 mol) in N,N-dimethyl-acetamide (20 ml) is stirred at room temperature for 20 minutes. The reaction mixture turns deep red. This is followed by the gradual addition of 1-bromoethylbenzene (4.62 g, 0.025 mol) in N,N-dimethylacetamide (5 ml). The reaction solution is stirred at room temperature for 24 hours and subsequently transferred into ice-water (150 mol). The aqueous phase is extracted with ethyl acetate (3 times 50 ml). The combined organic phases are dried over sodium sulfate and the solvent is removed in a high vacuum. The desired product is obtained as a yellowish oil (7.79 g) in a yield of 98%.

Preparation of propyl phenylmethyl trithiocarbonate (PPT)

Triethylamine (4.78 g, 0.047 mol) is gradually added to a solution of propanethiol (3.00 g, 0.039 mol) in chloroform (200 ml). The reaction mixture is stirred at room temperature for one hour. This is followed by the addition of carbon disulfide (7.50 g, 0.098 mol) and the reaction mixture is stirred at room temperature for a further two hours. This is followed by the addition of benzyl bromide (8.08 g, 0.047 mol) and the reaction solution is stirred at room temperature for 24 hours. This is followed by the addition of 10% hydrochloric acid (200 ml). The organic phase is separated off and washed with water (3 times 100 ml). The combined organic phases are dried over sodium sulfate and the solvent is removed in a high vacuum. The desired product is obtained as a yellowish oil (9.36 g) in a yield of 98%.

Preparation of furfuryl 2-bromopropionate

Triethylamine (5.26 g, 0.052 mol) is added to an ice-cooled solution of 2 furylmethanol (5.10 g, 0.052 mol) in 70 ml of chloroform. This is followed by the gradual addition of 2-bromopropionyl bromide (9.93 g, 0.046 mol) in 10 ml of chloroform. The reaction mixture is stirred at RT for 24 h. To workup, the reaction mixture is washed with water (1 times 80 ml), 10% sulfuric acid (1 times 80 ml) and with saturated $NaHCO_3$ solution (2 times 50 ml). The organic phase is dried over magnesium sulfate, concentrated and dried in a high vacuum. The yield is 67%.

Preparation of furfuryl 2-bromopropanethioate

The synthetic procedure is similar to the reaction protocol for furfuryl 2 bromopropionate except that 2 furylmethanethiol (5.94 g, 0.052 mol) is used in place of 2-furylmethanol.

Preparation of sodium propyl trithiocarbonate

An ice-cooled solution of propanethiol (4.00 g, 0.053 mol) in 50 ml of tetrahydrofuran is admixed with 50% sodium hydroxide solution. This is followed by the gradual addition of $CS_2$ (4.00 g, 0.053 mol). Care must be taken with this to ensure that the temperature does not rise above 10° C. The reaction mixture is stirred at room temperature for 24 h and recrystallized from hexane. The yield is 64%.

Preparation of propyl furfurylpropanioate trithiocarbonate

A solution of sodium propyl trithiocarbonate (1.12 g, 0.0064 mol) in 10 ml of DMSO is added to a solution of furfuryl 2-bromopropionate (1.49 g, 0.0064 mol) in DMSO (25 mol). The reaction mixture is stirred at RT for 48 h and then washed with diethyl ether (3 times 20 ml). The combined organic phases are washed with water and dried over sodium sulfate. The solvent is evaporated in a high vacuum to obtain the product in a yield of 72%.

The RAFT agent which contains at least a coupleable silyl group S is bound to the filler surface via the R1-group, where R1 is $-Si(OAlk)_3$, $-SiAlk(OAlk)_2$ or $-SiAlk_2(OAlk)$, where Alk is a divalent hydrocarbon of 1 to 18 carbon atoms, when the filler is silica.

Figure 5:
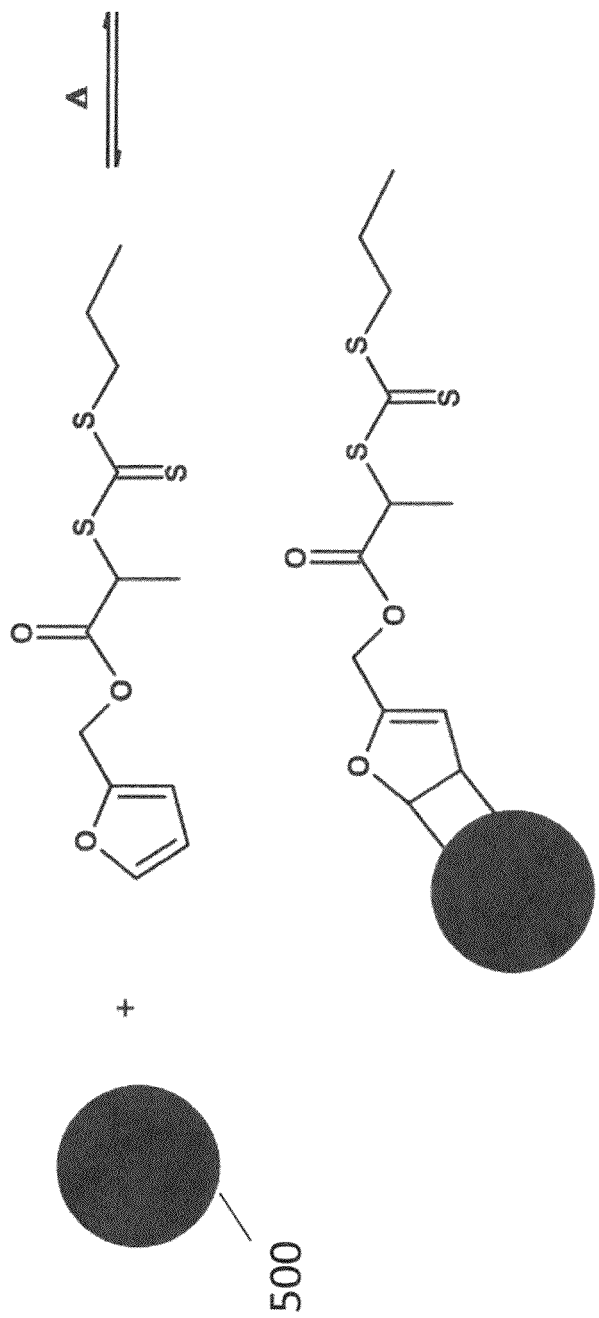
FIG. 5 shows the binding of a RAFT agent to particles of carbon black 500 via the one-step attachment mechanism.
Figure 6:
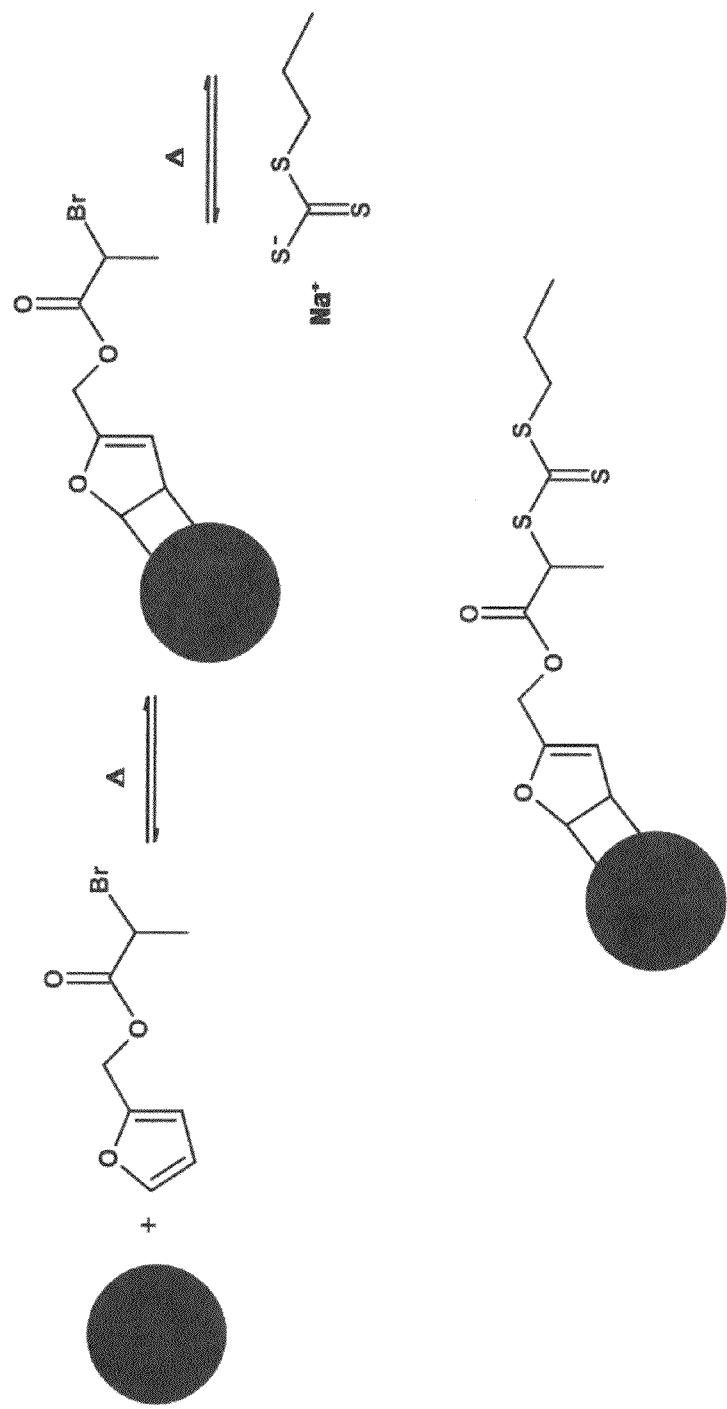
FIG. 6 shows the binding of a RAFT agent via the two-step attachment mechanism.
Figure 7:
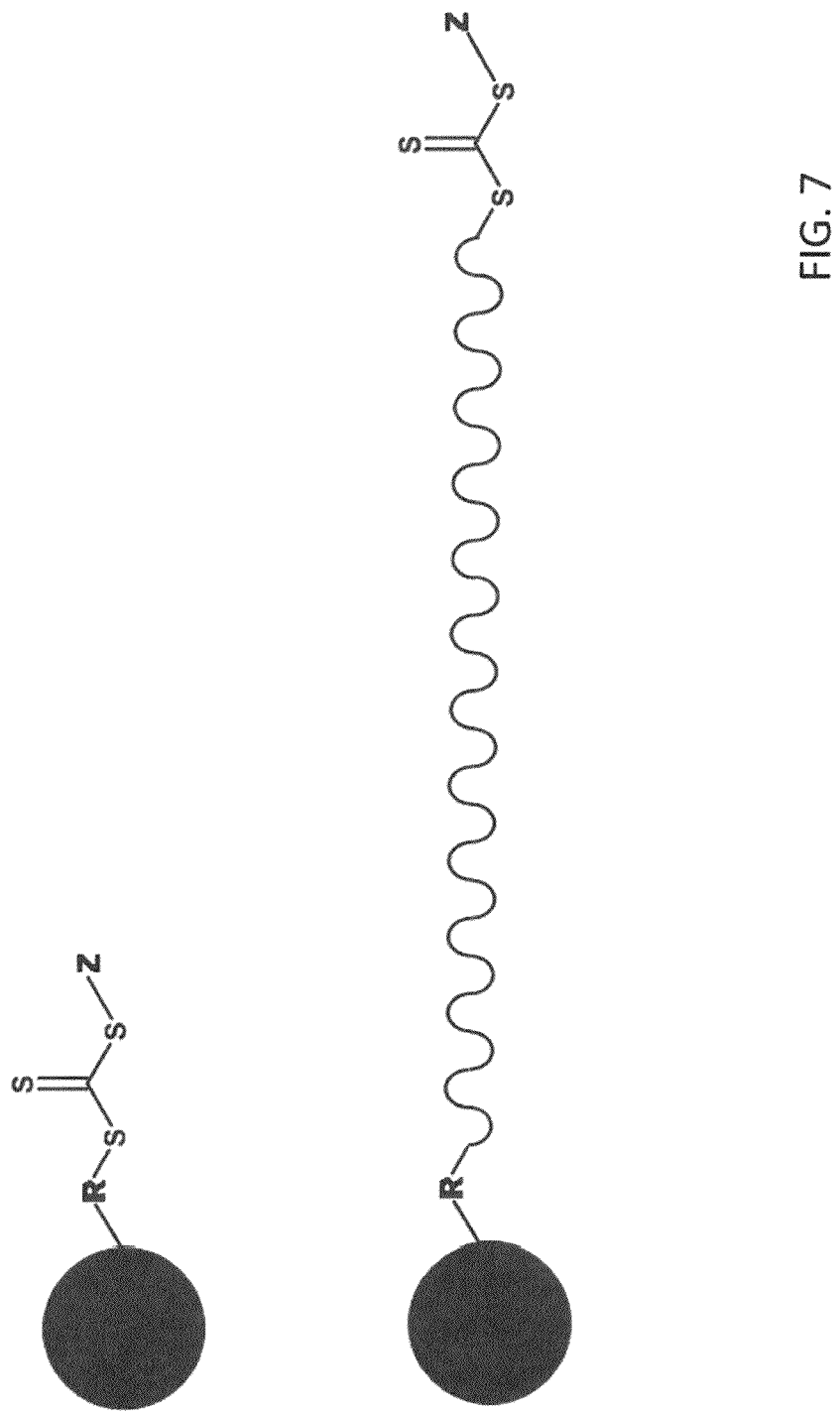
FIG. 7 shows exemplary embodiments of functionalized particles of carbon black employed in the R-group approach.

The RAFT agent is bound to the surface of the filler particles by a Diels-Alder reaction with a Diels-Alder reactive R1-group, such as a furyl-group, when the filler is carbon black (see FIGS. 5, 6 and 7).

Attachment via the Diels-Alder reaction and the structure of the RAFT agent implicate the following advantages:
1) Binding takes place without the formation of byproducts and can be carried out under mild reaction conditions.
2) Nothing further needs to be added (not even in catalytic amounts).
3) The immobilization can be carried out in a one- or two-stage synthesizing strategy. It is also possible for the immobilization to be effected via a Steglich esterification.
4) The immobilization is not quantitative. However, the loading density can be controlled via the reaction time and the temperature and optionally checked using elemental analysis.
5) Owing to the structure of the RAFT agent, the polymer chain can be split off at the ester/thioester bond after polymerization has ended to allow an analysis with regard to molecular weight and molecular weight distribution.

Immobilization proceeds via the R-group, resulting in the following advantages:
1) The reactive site for the addition of propagating free macroradicals moves away from the surface in the course of the polymerization. This, in relation to the attachment via the Z-group, implicates reduced steric hindrance between propagating chains and surface-attached chains. Hence a higher degree of occupancy can be realized.
2) After the controlled free-radical polymerization has ended, the functional group of the RAFT agent is at the free end of the chain, the end which is not attached to the filler surface. This opens avenues for the subsequent modification of the chain end.
3) Establishing the functional RAFT group at the polymer chain end implicates a certain proportion of sulfur atoms which can be used in the vulcanization for example.

Preparation of Surface-Modified Particles of Carbon Black in a One-Stage Method of Synthesis See FIG. 5 for an example.

A typical reaction comprises adding propyl 2-furfuryl-2-propanioate trithiocarbonate (1.31 g, 0.0043 mol) to a suspension of carbon black (0.557 g, 0.046 mol) in 30 ml of dibenzyl ether and stirring the reaction mixture at 100° C. for 24 hours. Thereafter, the carbon black is washed with THF in a Soxhlet for several hours and then dried in a high vacuum.

Compared with the untreated carbon black, elemental analysis finds a loading density of 0.118 mmol of RAFT agent per gram of carbon black.

Preparation of Surface-Modified Particles of Carbon Black in a Two-Stage Method of Synthesis See FIG. 6 for an example.

A typical reaction comprises adding furfuryl 2-bromopropionate (2.09 g, 0.009 mol) dropwise to a suspension of carbon black (5.40 g, 0.450 mol) in 200 ml of dibenzyl ether and stirring the reaction mixture at 130° C. for 48 hours. Thereafter, the carbon black is washed with THF in a Soxhlet and dried in a high vacuum.

The dried carbon black (5.40 g, 0.450 mol) is suspended in dimethyl sulfoxide and then admixed with sodium propyl trithiocarbonate (1.71 g, 0.009 mol). The reaction mixture is stirred at room temperature for 24 hours, washed with THF in a Soxhlet and dried in a high vacuum.

Compared with the untreated carbon black, elemental analysis finds a loading density of 0.192 mmol of RAFT agent per gram of carbon black.

When silica is the filler, the trimethoxysilane groups effect the binding.

Attachment proceeds in four steps. In the first step, the trimethoxysilane groups are hydrolyzed in the presence of water to form the corresponding silanol. These silanols condense together in the second reaction step and form oligomers. These oligomers combine with the hydroxyl groups on the silica surface to form strong hydrogen bonds. Finally, a covalent bond is formed with the surface of the substrate by elimination of water.

mers and among these preferably butadiene monomers will be found particularly advantageous to form polybutadiene or butadiene copolymers.

A further problem addressed by the present invention is that of providing rubber mixtures that have an improved polymer-filler bond and an improved dispersion for the filler in the rubber mixture. As a result, the rubber mixture displays optimized physical properties.

This problem is solved when the rubber mixture contains polymer-functionalized filler particles obtained by a process according to the present disclosure.

The abovementioned properties of the polymer-functionalized filler particles confer optimized physical properties on the rubber mixture.

The rubber mixture is useful in the manufacture of tires, especially passenger car tires, truck tires, two-wheeler tires or

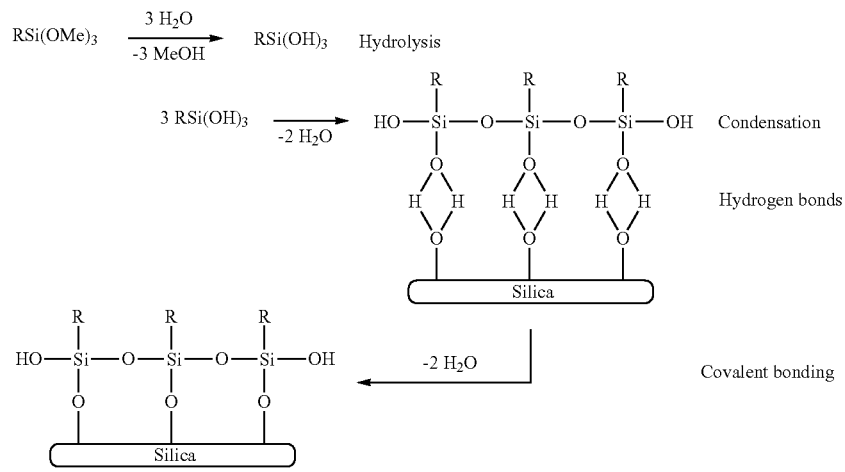

The loading density on the silica particles here can be controlled via suitable starting weights being used for the material.

Figure 8:
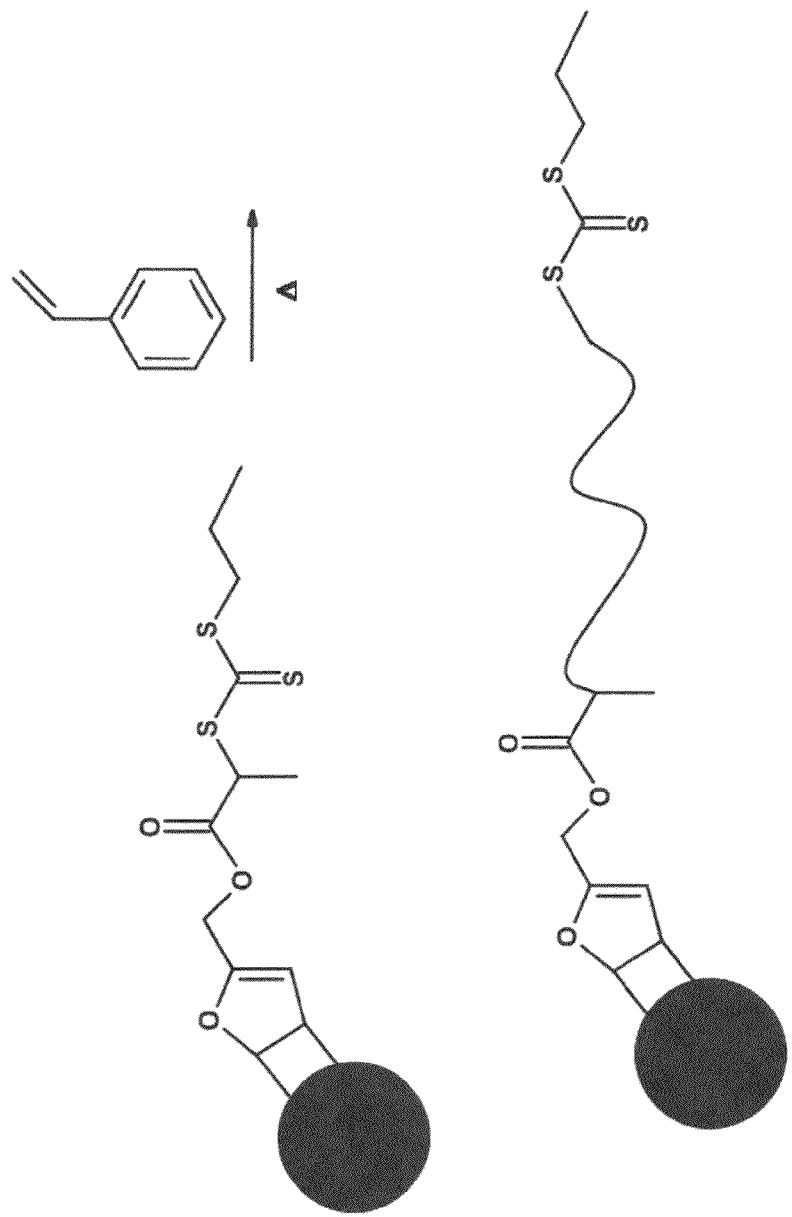
FIG. 8 shows an exemplary embodiment of a polymerization proceeding from modified particles of carbon black.
Figure 9:
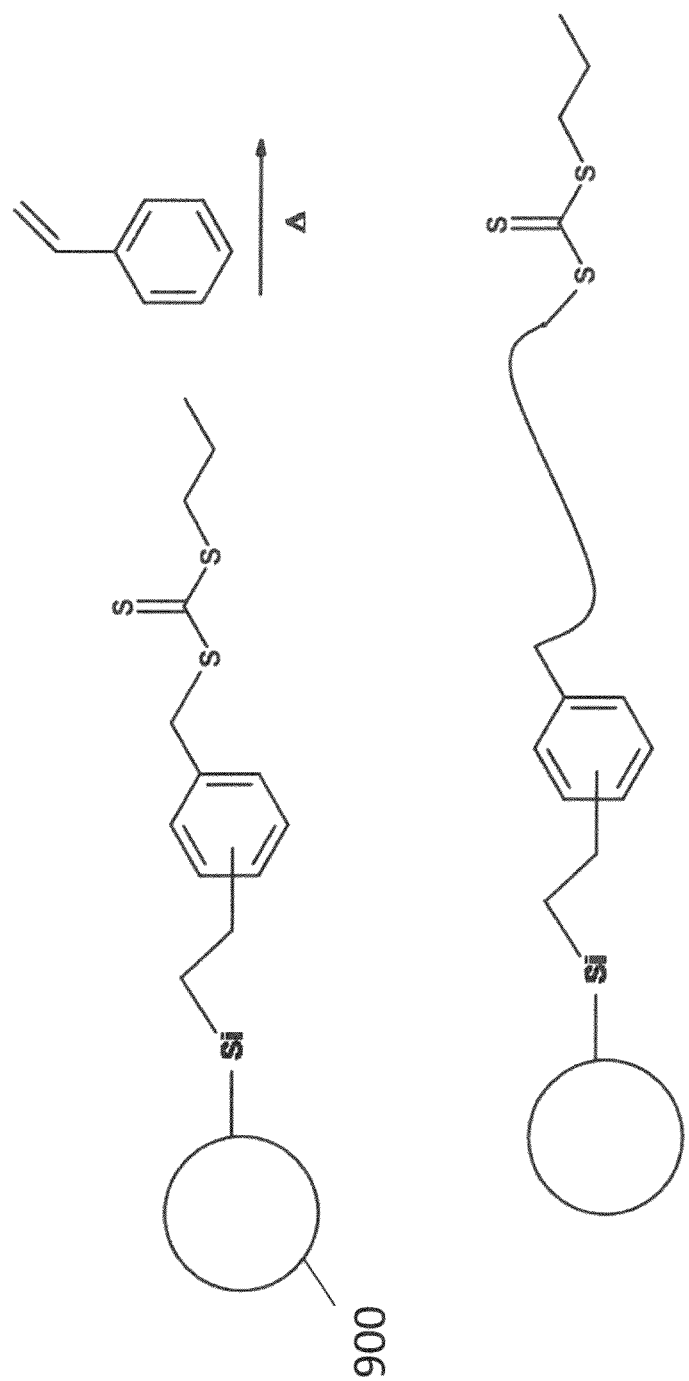
FIG. 9 shows an exemplary embodiment of a polymerization proceeding from modified particles of silica 900.

In a typical experiment, propyl(trimethoxysilane)ethylphenylmethyl trithiocarbonate (0.332 g, 0.851 mmol) is added dropwise to a vigorously stirred suspension of silica (17.75 g) in toluene (350 ml). A catalytic amount of saturated maleic anhydride solution (1 ml) is added dropwise and then the reaction mixture is intensively stirred at 60° C. for 24 hours. After the reaction has ended, the silica is washed with dichloromethane in a Soxhlet for several hours. Immobilization in this case is quantitative, so the loading density can be calculated to be 0.048 mmol of RAFT agent per gram of silica. After the RAFT agent has become bound to the surface of the filler particle, the controlled free-radical polymerization of monomers is effected by means of the control agent bound to the particle of filler. Polymerization thus proceeds directly away from the surface of the filler particle. The functional groups of the RAFT agent are at the free end of the polymer chain and move away from the surface, see FIGS. 8 and 9. This provides the advantages mentioned above.

Any free-radically polymerizable monomer can be used singly or in combination, so a homopolymer or a copolymer or a block polymer or a block copolymer is obtained on completion of the polymerization. The monomers used are preferably 1,2-butadiene, 1,3-butadiene, isoprene, styrene, acrylonitrile, 2-propenenitrile, vinyl compounds, methacryloyl compounds, acryloyl compounds and so-called "ene" compounds, such as norbornenes for example. Diene monoindustrial tires, which can also take the form of solid-rubber tires. The rubber mixture of the present disclosure is preferably used as tread strip, but the use as rubber mixture for body compounds is also possible. The rubber mixture is further useful in the manufacture of industrial rubber articles, for example belts, drive-belts, flexible tubes, seals, air bellows and printing blankets.

The rubber mixture, in addition to the rubber already present from the polymer-modified filler particles, may further contain at least one further polar or apolar rubber.

This polar or apolar rubber is selected from the group consisting of natural polyisoprene and/or synthetic polyisoprene and/or butadiene rubber and/or styrene-butadiene rubber and/or solution-polymerized styrene-butadiene rubber and/or emulsion-polymerized styrene-butadiene rubber and/or liquid rubbers and/or halobutyl rubber and/or polynorbornene and/or isoprene-isobutylene copolymer and/or ethylene-propylene-diene monomer rubber and/or nitrile rubber and/or chloroprene rubber and/or acrylate rubber and/or fluororubber and/or silicone rubber and/or polysulfide rubber and/or epichlorohydrin rubber and/or styrene-isoprene-butadiene terpolymer and/or hydrogenated acrylonitrile-butadiene rubber and/or isoprene-butadiene copolymer and/or hydrogenated styrene-butadiene rubber.

Especially nitrile rubber, hydrogenated acrylonitrile-butadiene rubber, chloroprene rubber, butyl rubber, halobutyl rubber or ethylene-propylene-diene monomer rubber are used in the manufacture of industrial rubber articles, such as belts, drive-belts and flexible tubes.

The rubber mixture further contains the polymer-functionalized filler particles of the present invention. As mentioned, the filler is preferably silica or carbon black.

When silica is the filler, the rubber mixture contains from 1 to 300 phr, preferably from 1 to 250 phr, more preferably from 1 to 200 phr, even more preferably from 1 to 150 phr, and yet even more preferably from 1 to 100 phr of polymer-functionalized particles of silica.

When carbon black is the filler, the rubber mixture contains from 1 to 180 phr, more preferably from 1 to 170 phr and even more preferably from 1 to 100 phr of polymer-functionalized particles of carbon black.

It is also possible for the rubber mixture to contain either polymer-functionalized particles of silica only or polymer-functionalized particles of carbon black only, or a combination thereof.

Further fillers known in the rubber industry, such as alumina, talc, kaolin, carbonates, metal oxides (magnesium oxides, iron oxides, titanium oxides for example), mica, carbon fibers, clay minerals, modified sheet-silicates and others may be present. It is similarly possible for fibers, of aramid or nylon for example, hollow microspheres or glass flakes to be additionally present in the rubber mixture.

The rubber mixture may additionally contain further additives. Further additives means essentially plasticizers, zinc oxide, the crosslinking system (crosslinker, sulfur donors and/or elemental sulfur, accelerators and retarders), ozone control agents, aging control agents, mastication assistants and further activators/processing aids. The proportion of the overall amount which is attributable to further additives is from 3 to 150 phr, preferably from 3 to 100 phr and more preferably from 5 to 80 phr.

Plasticizers used are preferably mineral oils, for example DAE (distillated aromatic extracts), RAE (residual aromatic extract), TDAE (treated distillated aromatic extracts), MES (mild extracted solvents) and/or naphthenic oils and/or synthetic plasticizers and/or fatty acids and/or a fatty acid derivative and/or a resin and/or a factice and/or vegetable oils or biomass-to-liquid (BTL) oils and/or liquid polymers.

The quantities phr as used herein are to be understood as meaning parts per hundred parts of rubber by weight, which is customary in the rubber industry for reporting mixing recipes. So the dosing of the parts by weight of the individual substances is always based on 100 parts by weight of the entire mass of all the rubbers present in the mixture.

The disclosure will now be more particularly explained with reference to comparative and operative examples, which are summarized in Tables 1 and 2. The mixtures marked "E" are inventive mixtures, while the mixtures marked "V" are comparative mixtures. Table 1 describes the construction of the polymer-functionalized particles of filler, while Table 2 illustrates the mixture composition in the top part and the physical properties of the mixture in the bottom part.

The mixtures were produced in multiple stages in a laboratory-scale tangential mixer under customary conditions. All the mixtures were used to produce test specimens by vulcanization which were used to determine material properties typical of the rubber industry. The following methods were employed for the above-described tests on test specimens:

rebound resilience at room temperature and 70° C. as per DIN 53 512
Shore A hardness at room temperature and 70° C. as per DIN 53 505
Stress value (modulus) at 100% and 200% strain at room temperature as per DIN 53 504
breaking extension at room temperature as per DIN 53 504
tensile strength at room temperature as per DIN 53 504
dynamic storage modulus E' at −25° C. as per DIN 53 513 at 8% strain

TABLE 1

| | Styrene-butadiene (SBR) | | Silica (Z1165 from Rhodia) phr | |
|---|---|---|---|---|
| | Styrene wt % | Vinyl wt % | | |
| MB1 | 23 | 18 | 40 | polymer not bound to silica via a catalyst |
| MB2 | 22 | 16 | 40 | polymer bound to silica via a catalyst |
| MB3 | 23 | 17 | 40 | polymer bound to silica via a catalyst with styrene block between silica and SBR |
| MB4 | 23 | 18 | 40 | polymer bound to silica via a catalyst with butadiene block between silica and SBR |

TABLE 2

| | Unit | V1 | E1 | E2 | E3 |
|---|---|---|---|---|---|
| Composition | | | | | |
| NR | phr | 10 | 10 | 10 | 10 |
| MB1 | phr | 126 | — | — | — |
| MB2 | phr | — | 126 | — | — |
| MB3 | phr | — | — | 126 | — |
| MB4 | phr | — | — | — | 126 |
| mineral oil, TDAE | phr | 5 | 5 | 5 | 5 |
| 6PPD, ozone control, steric acid | phr | 6.5 | 6.5 | 6.5 | 6.5 |
| ZnO | phr | 2.5 | 2.5 | 2.5 | 2.5 |
| DPG, CBS | phr | 4 | 4 | 4 | 4 |
| sulfur | phr | 2 | 2 | 2 | 2 |
| Properties | | | | | |
| hardness at RT | Shore A | 62.1 | 61.,8 | 58.5 | 60.9 |
| hardness at 70° C. | Shore A | 58.5 | 58.3 | 55.1 | 55.6 |
| rebound at RT | % | 36.2 | 35.8 | 33.2 | 36.4 |
| rebound at 70° C. | % | 44.0 | 47.0 | 47.8 | 47.8 |
| delta* rebound | | 3.08 | 2.41 | 2.32 | 2.49 |
| tensile strength | MPa | 9.63 | 8.11 | 8.85 | 8.1 |
| breaking extension | % | 319 | 304 | 289 | 304 |
| modulus 100% | MPa | 2.13 | 2.04 | 2.18 | 1.99 |
| modulus 200% | MPa | 5.53 | 5.63 | 5.81 | 5.01 |
| E' (−25° C.)** | MPa | 57.67 | 56.98 | 67.8 | 51.9 |

*delta: loss angle from vulcameter curve at t100, the smaller delta, the better the rolling resistance behavior
**from the Eplexor temperature sweep, the lower the stiffness at lower temperatures, the better the low-temp flexibility and hence the winter properties.

It is understood that the foregoing description is that of the preferred embodiments of the invention and that various changes and modifications may be made thereto without departing from the spirit and scope of the invention as defined in the appended claims.

What is claimed is:

1. A process for producing polymer-functionalized filler particles comprising:
   binding a control agent for a controlled free-radical polymerization of monomers on a surface of a filler particle;
   the control agent containing an R-group;
   the R-group containing an R1-group selected from the group consisting of a coupleable silyl group and a Diels-Alder-reactive functionality;
   the control agent further containing a reactive site for the addition of monomers;
   wherein the R1-group of the control agent becomes bound to the surface of the filler particle; and, performing the controlled free-radical polymerization of the monomers via the reactive site of the control agent bound to the filler particle to prepare a surface-bound block polymer and a second block polymer bound to the surface-bound block polymer;

wherein the surface-bound block polymer is selected from the group consisting of a polybutadiene block and a butadiene copolymer block.

2. The process as claimed in claim 1, wherein the filler particle is a silica particle.

3. The process as claimed in claim 1, wherein the filler particle is a carbon black particle.

4. The process as claimed in claim 1, wherein the control agent is a trithiocarbonate.

5. A polymer-functionalized filler particle obtained by the process as claimed in claim 1.

6. A rubber mixture comprising the polymer-functionalized filler particle as claimed in claim 5.

7. A method for the manufacture of a tire comprising preparing the rubber mixture as claimed in claim 6.

8. The method as claimed in claim 7 for the manufacture of a tread strip or of a body mixture of the tire.

9. A method for the manufacture of a belt, a drive-belt or a flexible tube, the method comprising preparing the rubber mixture as claimed in claim 6.

* * * * *